United States Patent
Takaku

[19]

[11] Patent Number: 5,862,736
[45] Date of Patent: Jan. 26, 1999

[54] CONNECTION STRUCTURE BETWEEN BRAKE BOOSTER AND CONTROL VALVE

[75] Inventor: Hitoshi Takaku, Saitama-Ken, Japan

[73] Assignee: Jidosha Kiki Co., Ltd., Tokyo, Japan

[21] Appl. No.: 791,135

[22] Filed: Jan. 30, 1997

[30] Foreign Application Priority Data

Feb. 29, 1996 [JP] Japan .................................. 8-069346

[51] Int. Cl.$^6$ ..................................................... F15B 9/10
[52] U.S. Cl. ........................................ 91/369.1; 91/376 R
[58] Field of Search .............................. 91/369.1, 369.2, 91/376 R; 92/161

[56] References Cited

U.S. PATENT DOCUMENTS

| | | | |
|---|---|---|---|
| 4,524,584 | 6/1985 | Kobayashi . | |
| 4,545,206 | 10/1985 | Kobayashi . | |
| 4,658,704 | 4/1987 | Mori et al. ............................... | 91/369.1 |
| 4,967,560 | 11/1990 | Konishi . | |
| 4,984,507 | 1/1991 | Suzuki et al. . | |
| 5,005,464 | 4/1991 | Takaku . | |
| 5,117,738 | 6/1992 | Horner, Jr. ............................... | 91/369.1 |
| 5,228,377 | 7/1993 | Watanabe ............................... | 91/376 R |
| 5,235,897 | 8/1993 | Watanabe . | |
| 5,247,868 | 9/1993 | Satoh et al. . | |
| 5,357,846 | 10/1994 | Rudolph et al. .................... | 91/376 R X |
| 5,475,977 | 12/1995 | Gautier et al. ..................... | 91/376 R X |
| 5,537,910 | 7/1996 | Watanabe . | |

FOREIGN PATENT DOCUMENTS 5-24533  2/1993  Japan .

OTHER PUBLICATIONS

Formal Drawings (3 sheets) re: U.S. Serial No. 08/704 452 Atty. Ref: Kanzaki Case 114 Filed Aug. 27, 1996.

*Primary Examiner*—Hoang Nguyen
*Attorney, Agent, or Firm*—Flynn, Thiel, Boutell & Tanis, P.C.

[57] ABSTRACT

The invention relates to a connection structure between a brake booster and a control valve which selectively introduces a negative pressure or an atmosphere into the booster. A brake booster of tandem type includes a front shell on which a pair of bosses are connected so as to extend parallel to each other. One end of one of the bosses is connected to a housing of the control valve while one end of the other boss is connected to the housing of the control valve through an L-shaped connection pipe. One end of the L-shaped connection pipe is rotatable with respect to one end of the other boss, and the other end of the L-shaped connection pipe is displaceable axially of the engaging opening in the housing during assembly. This construction allows the control valve to be assembled into the brake booster without requiring undue demand on the precision of the manufacturing various parts, while also minimizing the space required for the connection pipe.

4 Claims, 2 Drawing Sheets

CONNECTION STRUCTURE BETWEEN BRAKE BOOSTER AND CONTROL VALVE

FIELD OF THE INVENTION

The invention relates to a brake booster, and more particularly, to a connection structure between a brake booster and a control valve, which selectively introduces a negative pressure or an atmosphere, for example, into a brake booster.

DESCRIPTION OF THE PRIOR ART

A conventional brake booster generally comprises a valve body slidably disposed within a shell, a power piston mounted on the valve body for dividing the interior of the shell into a constant and a variable pressure chamber disposed across the power piston, and a valve mechanism disposed within the valve body and operable to switch a communication between a constant pressure passage communicating with the constant pressure chamber, a variable pressure passage communicating with the variable pressure chamber and a pressure passage communicating with the atmosphere.

An automatic brake unit is also known which actuates the brake booster without operating a brake pedal. The unit comprises bellows disposed within the constant pressure chamber and having its one end connected with the valve body to cause the interior of the bellows to communicate with the constant pressure passage and its other end connected to the internal surface of a front shell to cause the interior of the bellows to communicate with a conduit which is connected to the front shell, and a control valve disposed in the conduit.

The control valve is adapted to be capable of introducing a negative pressure or an atmosphere into the bellows. When a negative pressure is introduced into the bellows, both the bellows and the constant pressure chamber assume a negative pressure, which is similar to a conventional brake booster. Under this condition, the brake pedal maybe depressed to switch a flow path in the valve mechanism to introduce the atmosphere into the variable pressure chamber, whereupon a pressure differential between the constant and the variable pressure chamber provides a booster action.

On the other hand, when the atmosphere is introduced into the bellows through the control valve, the atmosphere is supplied to the variable pressure chamber through the constant pressure passage, the non-operative valve mechanism and the variable pressure passage. According, a pressure differential between the constant and the variable pressure chamber is effective to actuate the brake booster without the depression of the brake pedal.

As mentioned above, a connection is made between the control valve and the brake booster by a conduit in the prior art practice. If a rubber hose having an increased internal diameter is used for the conduit in order to secure an operational response of the brake booster, its external diameter also increases, requiring an increased space for its provision. In addition, the routing of the hose presents a difficulty.

The external diameter of the conduit can be reduced by using a metal pipe for the conduit. However, it is then necessary to manufacture the metal pipe with a high precision at its ports of juncture with the brake booster and the control valve, presenting a difficulty in its manufacture.

SUMMARY OF THE INVENTION

In view of the foregoing, the invention provides a connection structure between a brake booster and a control valve, which requires less space for the provision of a connection pipe and which is capable of mounting the control valve on the brake booster in a facilitated manner without undue demand on the precision required.

Specifically, a connection structure according to the invention comprises a pair of bosses mounted on the shell of the brake booster in parallel relationship to each other. One of the bosses is rotatably engaged with a first engaging opening formed in a housing of the control valve. The other boss is rotatably engaged by one end of a connection pipe having an L-shaped bend, the other end of which is engaged with a second engaging opening formed in the housing of the control valve in a manner displaceable axially of the second engaging opening, thus securing the control valve to the shell.

With the described structure, during assembly, said one boss may be engaged with the first engaging opening formed in the housing of the control valve and simultaneously the other boss may be rotatably engaged by one end of the connection pipe while the other end of the connection pipe is maintained in engagement with the second engaging opening formed in the housing of the control valve.

It will be noted that in this instance, a spacing between the pair of bosses mounted on the shell of the brake booster represents a most significant dimensional error, which can be accommodated for by an adjustment of axially displacing the other end of the connection pipe relative to the second engaging opening, and a concomitant relative rotation between the one end of the connection pipe and the boss and between the first engaging opening in the control valve and the boss.

Accordingly, the assembly is facilitated without requiring that the bosses, the connection pipe and/or the first and second engaging opening in the control valve be manufactured to an unduly high precision, and subsequent to the assembly, the control valve is mounted on the shell of the brake booster, thus reducing the space requirement.

Above and other objects, features and advantages of the invention will become apparent from the following description of one embodiment thereof with reference to the attached drawings.

DETAILED DESCRIPTION OF THE EMBODIMENTS

Figure 1:
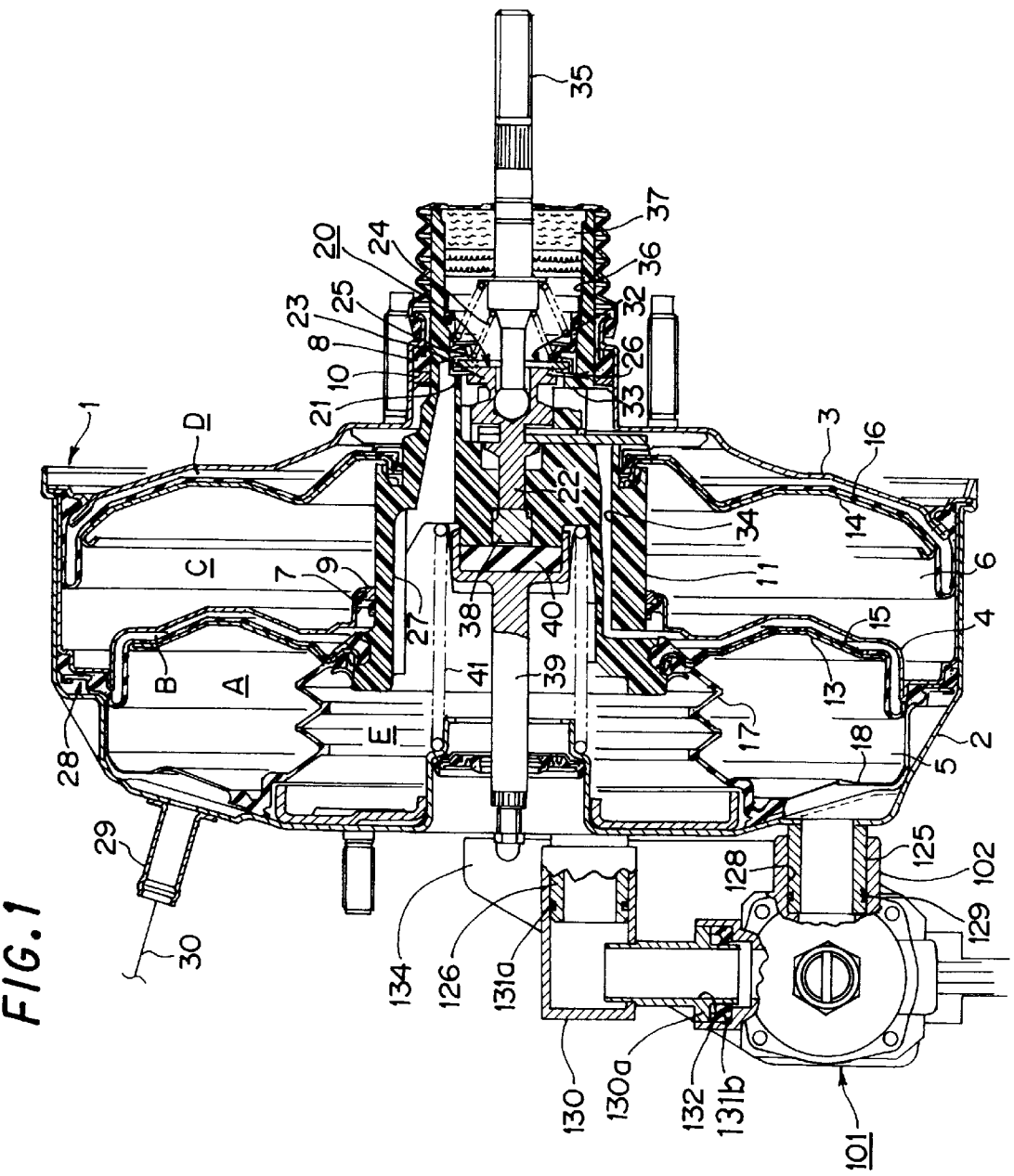
FIG. 1 is a cross section of one embodiment of the invention.

Referring to the drawings for describing the present invention, FIG. 1 shows a brake booster of tandem type 1 which boosts a force of depression applied to a brake pedal, and which is associated with a control valve 101 which supplies the atmosphere to the brake booster 1 to actuate it automatically without operating the brake pedal.

The brake booster 1 of tandem type is provided with an enclosed space defined by a front and a rear shell 2, 3, and the interior of the enclosed space is divided by a center plate 4 into a front chamber 5 and a rear chamber 6, which are located thereacross. A substantially tubular valve body 11 slidably extends through axial portions of the center plate 4 and the rear shell 3, with seal members 7, 8, and bearings 9, 10 interposed therebetween to maintain a hermetic seal.

A front power piston 13 and a rear power piston 14 are connected to the outer periphery of the valve body 11 in regions which are located in the front chamber 5 and the rear chamber 6, respectively, and a front diaphragm 15 and a rear diaphragm 16 are applied to the back surfaces of the respective power pistons 13, 14. In this manner, a constant pressure chamber A and a variable pressure chamber B are defined across the front diaphragm 15, and a constant pressure chamber C and a variable pressure chamber D are defined across the rear diaphragm 16.

Bellows 17 is disposed within the constant pressure chamber A, and has its rear end connected to the front end of the valve body 11 around the outer periphery thereof while maintaining a hermetic seal. The front end of the bellows 17 is held in abutment against the front inner wall of the front shell 2 by a support member 18. The bellows 17 provides a partition within the constant pressure A mentioned above between an inner space or bellows chamber E and an outer space or the remainder of constant pressure chamber A.

A valve mechanism 20 which switches a communication between the constant pressure chambers A, C and the variable pressure chambers B, D is disposed within the valve body 11. The valve mechanism 20 comprises an annular, first valve seat 21 formed on the valve body 11, an annular, second valve seat 23 located radially inward of the first valve seat 21 and formed on a valve plunger 22 which is slidably disposed within the valve body 11, and a valve element 25 which is urged by a spring 24 to be seated upon either valve seat 21 or 23.

An annular seat defined by a combination of the first valve seat 21 and the valve element 25 which engages with or disengages from it defines a vacuum valve 26. A space located radially outward of the vacuum valve 26 communicates with the bellows chamber E through a constant pressure passage 27 which is formed in the valve body 11.

The constant pressure chambers A, C communicate with each other through a constant pressure passage 28 formed around the outer periphery of the front diaphragm 15, and also communicate with a source of negative pressure, not shown, through a tubing 29 which is connected to the front shell 2 in order to introduce a negative pressure, and through a conduit 30 which is connected thereto, whereby a negative pressure is normally introduced into the constant pressure chambers A, C. A specific construction of the constant pressure passage 28 is known in the art as disclosed in Japanese Laid-Open Patent Application No. 24,533/93, for example, and therefore will not be specifically described.

An atmosphere valve 32 is defined by a seat formed by a combination of the second valve seat 23 and the valve element 25 which engages with or disengages from it. A space located radially inward of the vacuum valve 26 and radially outward of the atmosphere valve 32 communicates with the variable pressure chamber D through a radially extending first variable pressure passage 33 formed in the valve body 11, and the variable pressure chamber D in turn communicates with the variable pressure chamber B through an axially extending second variable pressure passage 34 formed in the valve body 11.

Finally, a space located radially inward of the atmosphere valve 32 communicates with the atmosphere through an atmosphere passage 36 formed between the inner peripheral surface of the valve body 11 and the outer peripheral surface of an input shaft 35 which is pivotally connected with the right end of the valve plunger 22, and a filter 37 is disposed in the atmosphere passage 36.

On the other hand, the left end of the valve plunger 22 is disposed in opposing relationship with a reaction disc 40 received in one end of an output shaft 39 through an interposed plate plunger 38. The left end of the output shaft 39 extends through an opening formed in the wall of the front shell 2 to be coupled to a piston of a master cylinder, not shown. A return spring 41 disposed between the front shell 2 and the valve body 11 normally maintains the valve body 11 in its inoperative position shown.

In the brake booster 1 of tandem type mentioned above, when the booster is not actuated, the valve element 25 is seated upon the second valve seat 23 to close the atmosphere valve 32 while the first valve seat 21 is removed from the valve element 25 to open the vacuum valve 26, whereby the bellows chamber E and the variable pressure chambers B, D communicate with each other. At this time, a negative pressure is supplied from the control valve 101 which is constructed in a manner to be described in detail later, and accordingly, the constant pressure chambers A, C as well as the bellows chamber E and the variable pressure chambers B, D across the both power pistons 13, 14 assume an equal pressure.

If a brake pedal is now depressed to drive the input shaft 35 and the valve plunger 22 forward, the valve element 25 becomes seated upon the first valve seat 21 to close the vacuum valve 26 while the valve element 25 is removed from the second valve seat 23 to open the atmosphere valve 32, whereby a pressure differential is developed between the constant pressure chambers A, C and the bellows chamber E and the variable pressure chambers B, D across both power pistons 13, 14, providing a booster action in accordance with a force of depression.

By contrast, if the atmosphere is introduced into the bellows chamber E through the control valve 101 under the inoperative condition mentioned above, the atmosphere passes from the bellows chamber E through the constant pressure passage 27, the vacuum valve 26, the both variable pressure passages 33, 34 to be introduced into the variable pressure chambers B, D, whereby a pressure differential is developed between the constant pressure chambers A, C and the variable pressure chambers B, D disposed across the both power pistons 13, 14. In this manner, booster action is automatically achieved without depressing a brake pedal.

Figure 2:
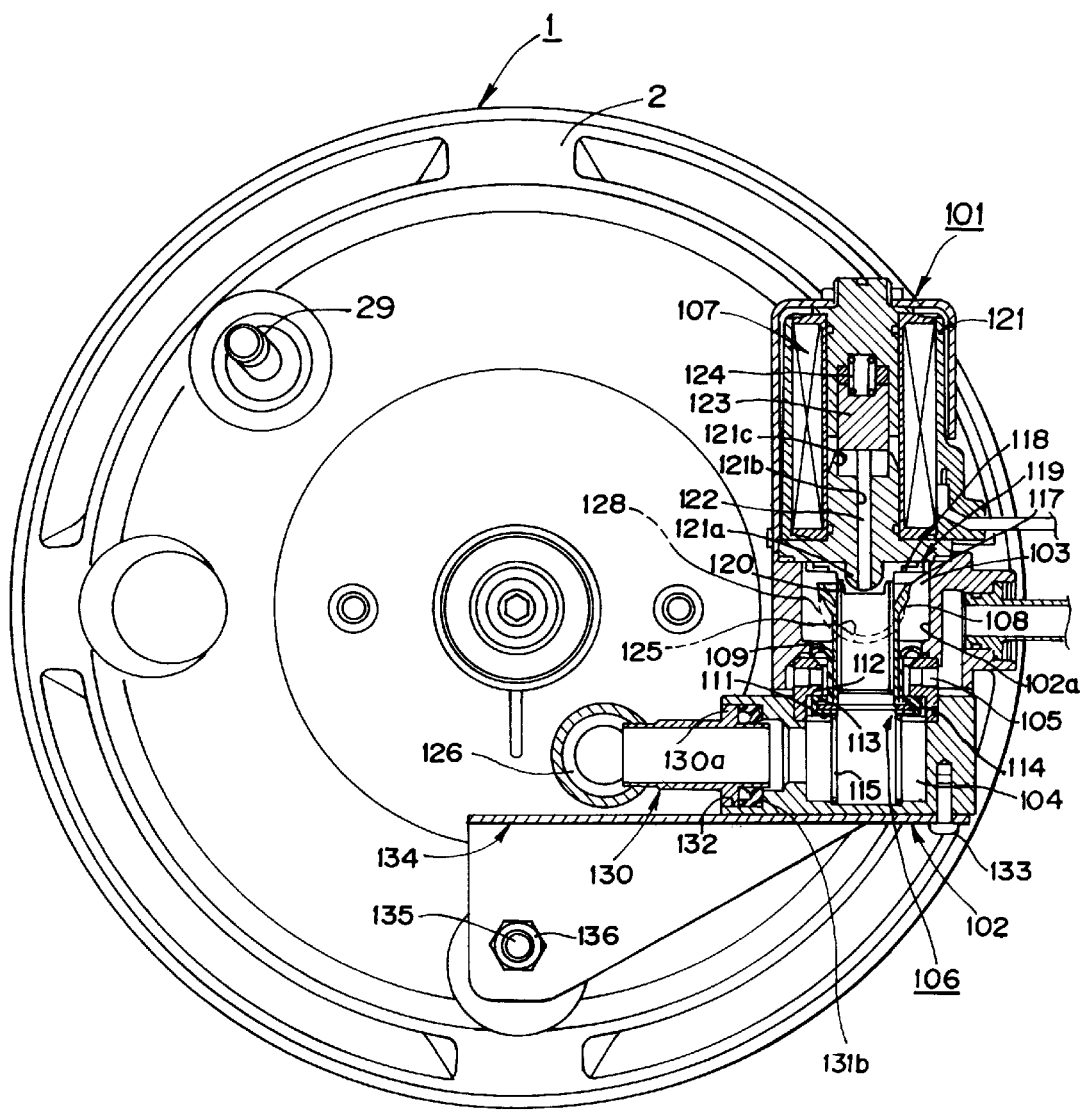
FIG. 2 is a left-hand side elevation of the structure shown in FIG. 1, with control valve 101 shown in section.

Referring to FIG. 2, the control valve 101 comprises a negative pressure chamber 103, a control pressure chamber 104 and an atmosphere chamber 105 which are formed in a housing 102, a valve mechanism 106 which switches the communication of each chamber, and a solenoid acting as an actuator 107 which actuates the valve mechanism 106. The actuator 107 is controlled by a controller, not shown, developing a force dependent on the magnitude of a current which energizes the actuator 107.

The housing 102 is formed with a vertically extending communication opening 102a, and the valve mechanism 106 is disposed to coat with the communication opening 102a and the respective chambers 103, 104 and 105. The valve mechanism 106 is provided with a hollow cylindrical piston 108, which extends through the communication opening 102a. A diaphragm 109 formed of rubber is disposed across the piston 108 and the bottom surface of the negative pressure chamber 103. The top end of the piston 108 is disposed within the negative pressure chamber 103 while the lower end of the piston 108 as well as the lower end of the diaphragm 109 are disposed in the control pressure chamber 104.

An annular stop 111 is fixedly mounted at a given location within the control pressure chamber 104 which is below the lower end of the diaphragm 109, and defines a lower end position for the diaphragm 109 and the piston 108 as they move down.

On the other hand, an upper portion of the diaphragm 109 is folded outward relative to its lower portion and an axial end of the diaphragm 10 having an increased wall thickness is embedded in the bottom surface of the negative pressure chamber 103 while maintaining its surrounding relationship with respect to the communication opening 102a. In this manner, the axial end of the diaphragm 109 is connected to the bottom surface of the negative pressure chamber 103 while maintaining a hermetic seal.

A boundary between the control pressure chamber 104 and the communication opening 102a is provided as a stepped end face, which is used as a first valve seat 112, and a lower end of the diaphragm 109 having an increased wall thickness and which is located below the end face is used as a first valve element 113. A combination of the first valve seat 112 and the first valve element 113 defines an atmosphere valve 114 which switches a communication between the control pressure chamber 104 and the atmosphere chamber 105.

A spring 115 is disposed between the lower end of the diaphragm 109 and the bottom surface of the control pressure chamber 104, whereby the piston 108 and diaphragm 109 are normally urged to their inoperative positions shown. Under the inoperative conditions shown when the actuator 107 is not energized, the resilience of the spring 115 causes the first valve element 113 to be seated upon the first valve seat 112, thus closing the atmosphere valve 114. Under this condition, a communication between the control pressure chamber 104 and the atmosphere chamber 105 is interrupted.

An upper portion of the piston 108 which is disposed within the negative pressure chamber 103 has a tapered configuration having an increasing diameter toward the top end thereof, which is used as a second valve element 117. A movable second valve seat 118 which is generally conical in configuration is disposed above and adjacent to the second valve element 117. A combination of the second valve element 117 and the second valve seat 118 which engages with or disengages from it defines a negative pressure valve 119 which switches a communication between the negative pressure chamber 103 and the control pressure chamber 104. A spring 120 is disposed between the second valve seat 118 and a step formed around the inner periphery of the piston 108, and normally urges the second valve seat 118 and the second valve element 117 to be spaced apart.

The actuator 107 which is disposed above the second valve seat 118 includes a frame 121 which is fitted into the housing 102 in a manner to maintain a hermetic seal, and includes a conical projection 121a, formed in its axial portion, which faces the negative pressure chamber 103. The second valve seat 118 is disposed below and adjacent to the projection 121a. Since the second valve seat 118 is urged by the spring 120 as mentioned above, the entire rear surface of the second valve seat 118 engages the projection 121a from below in the non-actuated condition of the actuator 107.

The axial portion of the frame 121 or the axial portion of the projection 121a is formed with a stepped guide opening 121b including a lower portion in which a first rod 122 having a small diameter is slidably disposed, and which continues to an upper opening 121c of a larger diameter in which a second rod 123 having a larger diameter and which is formed of a magnetizable material is slidably fitted.

A spring 124 is disposed between the upper surface of the second rod 123 and the bottom surface of the guide opening 121b which is located opposite thereto, whereby the lower end of face of the second rod 123 abuts against the upper end of the first rod 122, the lower end of which in turn abuts against the rear surface of the second valve seat 118 in its axial portion. Under this condition, the both rods 122, 123 and the second valve seat 118 are normally urged downward.

It is to be noted that the resilience of the spring 115 disposed in the control pressure chamber 104 is chosen to be greater than a combined resilience of the both springs 120 and 124, and the resilience of the spring 124 is chosen to be less than the resilience of the spring 120.

In the control valve 101 constructed in the manner mentioned above, when the actuator 107 is deenergized, the first valve element 113 is seated upon the first valve seat 112 to interrupt a communication between the control pressure chamber 104 and the atmosphere chamber 105, and the second valve element 117 is removed from the second valve seat 118 to allow a communication between the negative pressure chamber 103 and the control pressure chamber 104, whereby a negative pressure is introduced into the control pressure chamber 104.

By contrast, when the actuator 107 is energized, the first rod 122 and the second rod 123 move down to cause the second valve element 117 to be seated upon the second valve seat 118 to interrupt a communication between the negative pressure chamber 102 and the control pressure chamber 104, and the first valve element 113 is removed from the first valve seat 112 to allow the communication between the control pressure chamber 104 and the atmosphere chamber 105, whereby the atmosphere is introduced into the control pressure chamber 104. In this manner, either a negative pressure or the atmosphere is selectively introduced into the control pressure chamber 104.

A connection structure between the brake booster 1 and the control valve 101 which is constructed in accordance with the invention will now be described. A pair of pipe-shaped bosses 125, 126 are mounted on the front end face of the front shell 2 so as to extend axially forward and parallel to each other. One of the bosses, 125, or a first boss communicates with the constant pressure chamber A while the other or second boss 126 communicates with the bellows chamber E.

The first boss 125 is rotatably fitted into a first engaging opening 128 formed in the housing 102 of the control valve 101 by using a seal member 129 which maintains a hermetic seal, the first engaging opening 128 communicating with the negative pressure chamber 103 of the control valve 101. In this manner, the negative pressure chamber 103 communicates with a source of negative pressure through the first engaging opening 128, the first boss 125, the constant pressure chamber A, the tubing 29 and the conduit 30, whereby a negative pressure is normally introduced into the negative pressure chamber 103.

On the other hand, the second boss 126 is rotatably fitted into one end of an L-shaped connection pipe 130 with a seal member 131a which maintains a hermetic seal. The other end of the connection pipe 130 is fitted into a second engaging opening 132 formed in the housing 102 so as to be axially displaceable, with a seal member 131b maintaining a hermetic seal therebetween.

It is to be noted that one end and the other end of the L-shaped connection pipe 130 are disposed at the locations which are at quadrature to each other, as are the first and the second engaging opening 128, 132 formed in the housing 102. To accommodate for manufacturing tolerances with respect to the degree of quadrature between these locations and to the parallelism between the pair of bosses 125, 126, the other end of the connection pipe 130 is provided with a flange 130a which is loosely fitted into the second engaging opening 132, the flange 130a preventing the seal member 131b, which is cup-shaped, from being disengaged from the second engaging opening 132.

Since the second engaging opening 132 communicates with the control pressure chamber 104 in the control valve 101, it follows that the control pressure chamber 104 communicates with the constant pressure passage 27 through the second engaging opening 132, the connection pipe 130, the second boss 126 and the bellows chamber E.

Accordingly, by selectively introducing a negative pressure or the atmosphere into the control pressure chamber 104 in the manner mentioned above, the negative pressure or the atmosphere can be supplied to the constant pressure passage 27. As mentioned previously, when the negative pressure is supplied, the depression of a brake pedal allows a booster action to be achieved by switching a flow path in the valve mechanism 20. When the atmosphere is supplied, the brake booster can be actuated without depressing the brake pedal.

The control valve 101 is fixedly mounted by utilizing a bracket 134 which is mounted on the housing 102 by a bolt 133, and the end of which is secured to a devoted stud 135 provided on the outside of the front shell 2 by a nut 136.

When mounting the control valve 101 on the brake booster 1, the other end of the connection pipe 130 is initially fitted into the second engaging opening 132, and while adjusting or moving the other end of the connection pipe 130 axially of the second engaging opening 132, the first engaging opening 128 is engaged with the first boss 125 and one end of the connection pipe 130 is engaged with the second boss 126, while simultaneously engaging the end of the bracket 134 mounted on the housing 102 with the stud 135.

As mentioned previously, at this time, a spacing between the pair of bosses 125, 126 mounted on the front shell 2 of the brake booster 1 represents a most significant dimensional error, which can be accommodated for by an adjustment of axially displacing the other end of the connection pipe 130 with respect to the second engaging opening 132 and by a relative rotation between the first engaging opening 128 and the first boss 125 and between that one end of the connection pipe 130 and the second boss 126.

It will be noted that the relative rotation between the first engaging opening 128 and the first boss 125 is equivalent to a relative rotation between the housing 102 and the first boss 125. While a rotation of the housing 102 results in an offset between the end of the bracket 134 and the stud 135, such offset is minimal in actuality and can be accommodated for by a clearance between the stud 135 and an opening formed in the end of the bracket 134 to allow the stud to pass therethrough, which is normally available.

Any manufacturing error in the degree of quadrature between one end and the other end of the L-shaped connection pipe 130 and also between the first and second engaging opening 128, 132 formed in the housing 102 or in the parallelism between the pair of the bosses 125, 126 would appear to cause the other end of the connection pipe 130 to be fitted into the second engaging opening 132 askew, but in actuality, such error can be accommodated for by a loose fitting of the flange 130a at the other end of the connection pipe 130 within the second engaging opening 132.

As described, the control valve 101 can be easily assembled into the brake booster 1 without requiring undue demand on the precision of manufacturing the bosses 125, 126, the connection pipe 130 or the first and the second engaging opening 128, 132 formed in the control valve 101. After the assembly, because the control valve 101 is directly mounted on the front shell 2 of the brake booster 1, any space requirement for the connection pipe 130 can be minimized.

In the described embodiment, the interior of the pair of bosses 125, 126 has been utilized as passages, but such use is not essential. For example, an automatic brake booster is known in the art in which a variable pressure chamber of a normal brake booster communicates with the atmosphere through an open/close valve acting as a control valve, which is normally maintained closed, but which is opened when the booster is to function as an automatic brake unit. In such instance, a pair of bosses may be mounted on the rear shell, and only one of the bosses may be utilized as a path which communicates with the atmosphere.

While the invention has been shown and described above in connection with a preferred embodiment thereof, it should be understood by one skilled in the art that a number of changes, modifications and substitutions therein are possible from the above disclosure without departing from the scope and spirit of the invention defined by the appended Claims.

What is claimed is:

1. In combination, a brake booster, a control valve, and a connection structure between said brake booster and control valve, the connection structure comprising a pair of bosses mounted on a shell of said brake booster in parallel relationship with each other, one of the bosses being rotatably engaged with a first engaging opening formed in a housing of said control valve while the other boss is rotatably engaged by one end of a connection pipe having a L-shaped bend, the other end of the connection pipe being engaged with a second engaging opening formed in the housing of the control valve so as to be displaceable axially of the second engaging opening, thus securing the control valve to the shell.

2. A connection structure according to claim 1 in which the other end of the connection pipe is provided with a flange, which is loosely fitted in the second engaging opening, the flange also preventing a seal member which provides a seal between the connection pipe and the second engaging opening from being disengaged.

3. A connection structure according to claim 1 in which the first engaging opening communicates with either one of a constant pressure chamber of the brake booster and a constant pressure passage of a valve mechanism through the boss while the second engaging opening communicates with the other of the constant pressure chamber and the constant pressure passage through the connection pipe and the associated boss, the control valve being selectively operable to cause both the first and the second engaging opening to communicate with a negative pressure or to cause the first engaging opening to communicate with a negative pressure, while causing the second engaging opening to communicate with the atmosphere.

4. A connection structure according to one of the claim 3 in which the boss and the constant pressure passage of the valve mechanism communicate with each other through tubular bellows disposed within the constant pressure chamber and having its one end mounted on the internal surface of the shell and its other end mounted on the end face of a valve body.

* * * * *

UNITED STATES PATENT AND TRADEMARK OFFICE
CERTIFICATE OF CORRECTION

PATENT NO.   : 5 862 736
DATED        : January 26, 1999
INVENTOR(S)  : Hitoshi TAKAKU It is certified that error appears in the above-identified patent and that said Letters Patent is hereby corrected as shown below:

Column 8, line 58; delete "one of the".

Signed and Sealed this

First Day of February, 2000

Attest:

Attesting Officer

Q. TODD DICKINSON

Acting Commissioner of Patents and Trademarks